March 24, 1959     H. D. COGHILL     2,879,184
METHOD OF RENDERING TITANIUM DIOXIDE
FILMS ELECTRICALLY CONDUCTIVE
Filed March 30, 1956
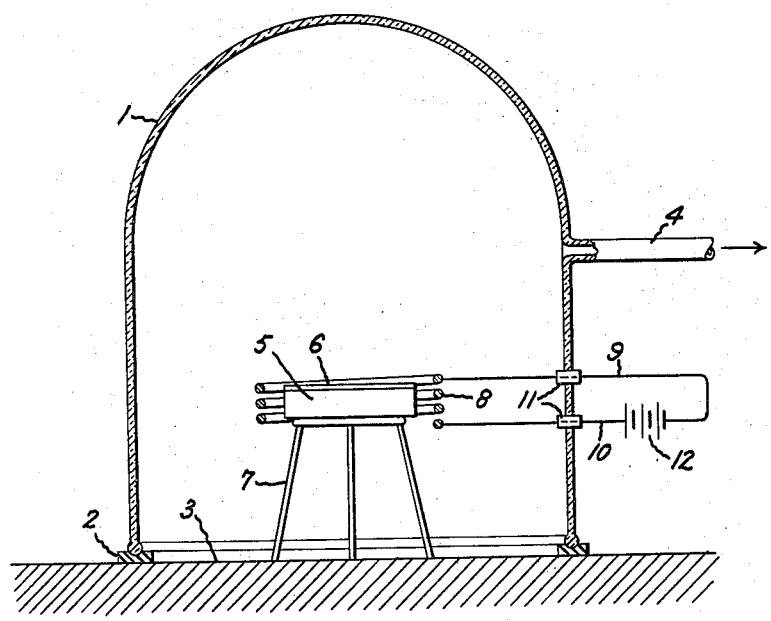
Inventor:
Henry D. Coghill,
by Paul A. Frank
His Attorney.

United States Patent Office 2,879,184
Patented Mar. 24, 1959

2,879,184

METHOD OF RENDERING TITANIUM DIOXIDE FILMS ELECTRICALLY CONDUCTIVE

Henry D. Coghill, Charlton, N.Y., assignor to General Electric Company, a corporation of New York Application March 30, 1956, Serial No. 575,024

5 Claims. (Cl. 117—221)

This invention relates in general to transparent films, and, more particularly, to methods for making such transparent films electrically conducting.

Transparent electrically conducting films find great utility in the manufacture of cathode ray tubes as charge dissipating electrodes. Such films are also of great utility in the manufacture of electroluminescent cells, electroluminescent devices in general, and as area heat sources.

For many applications tin oxide, known to the art as conducting glass, is used where a transparent conducting film is necessary or desirable. For many applications, however, tin oxide may not be used. One such instance is in the preparation of luminescent films and electroluminescent cells wherein vapor deposited films of zinc or cadmium sulfide are deposited upon a transparent conducting film to form a portion of either a cathode ray tube screen or an electroluminescent cell. When such deposition takes place at high temperature, both the conducting characteristics of the transparent film, and the luminescent qualities of the zinc or cadmium sulfide film are destroyed by chemical reaction between the two films. For this, and other purposes, it is desirable that transparent conducting films other than tin oxide be provided.

Presently the most useful material, other than tin oxide, for use as a transparent conducting film is titanium dioxide. Titanium dioxide, however, as initially formed, is not conducting and possesses a resistance which is not measurable by ordinary resistance measuring instruments. It is known, however, that the resistance of a thin film of titanium dioxide is in excess of 100 megohms per square.

Although several successful methods by which films of titanium dioxide may be rendered conductive are presently known, none of these methods is entirely satisfactory for all purposes.

It is, therefore, a primary object of this invention to provide a new and improved method for rendering titanium dioxide films electrically conductive.

A further object of the invention is to provide a method for producing higher electrical conductivity in titanium dioxide films than has been heretofore obtainable.

Another object of the invention is to provide a method for rendering titanium dioxide films electrically conductive which is simple, inexpensive and easily reproducible.

In accord with one aspect of my invention I suspend a suitable base plate upon which a titanium dioxide film has been deposited in an evacuable chamber. The chamber is then evacuated and the plate upon which the titanium dioxide film is deposited is heated to high temperature for a short period of time while the chamber is maintained evacuated. After a short period of time it is found that the electrical conductivity of the titanium dioxide film has been raised to a value heretofore unobtainable.

The novel features believed characteristic of the invention are set forth in the appended claims. The invention itself, together with further objects and advantages thereof may best be understood by reference to the following description, taken in connection with the accompanying drawing which illustrates a typical apparatus with which the method of the invention may be practiced.

The apparatus of the drawing comprises an evacuable container 1, which may conveniently be a bell jar, sealed by a retaining ring 2 to a supporting surface 3 to form a vacuum tight seal. A tubular connector 4 connects container 1 to a vacuum pump capable of maintaining a very high degree of evacuation or low pressure within container 1. Such a pump may conveniently be a mercury diffusion pump, well known to the art.

Within chamber 1 a transparent base plate having a fusion temperature in excess of 700° and which may conveniently be glass, Pyrex glass, quartz or other equivalent materials, having thereupon a transparent film 6, of titanium dioxide is supported upon a stand 7. Plate 5 is surrounded by a heater coil 8 which generally represents any suitable heater for raising the temperature of plate 5 to the temperatures utilized in the practice of the invention. Conductors 9 and 10 leave container 1 by vacuum tight seals 11 and are connected to a source of electric potential either unidirectional or alternating, represented generally as battery 12.

Titanium dioxide film 6 may be formed upon plate 5 by spraying a stream of titanium tetrachloride vapor over plate 5 while the plate is heated, preferably to a temperature of from 200 to 250° C. in a moist atmosphere. Lower temperatures may be used, but at lower temperatures (in the vicinity of 150° C., for example) the film becomes granular. At higher temperatures, as, for example 300°, the film tends to become discolored. Titanium dioxide film 6 may be of any convenient thickness related to the purpose for which it is to be utilized. Conveniently, however, film 6 may be from 0.1 to 1.0 micron thick. The thickness of film 6 may be measured by several means. For films greater in thickness than approximately 0.7 micron, optical measurements are most frequently used. Films of thickness below 0.7 micron may be measured, and their thickness controlled in formation, by the observance of the apparent change in color of the film due to the occurrence of successive orders of interference colors. Thus, films which are to be used as electrodes for electroluminescent cells are generally formed to a thickness evidenced by the formation of a second or third order of interference colors (approximately 0.2 to 0.4 micron).

One method by which film 6 may be formed is described and claimed in U.S. Patent No. 2,732,313 to Cusano and Studer. In accord with this method, water vapor and titanium tetrachloride are co-mingled in the vicinity of a suitable base plate which is maintained at a temperature of 200 to 250° C. in a closed chamber. Alternatively, titanium dioxide films may be formed by merely spraying titanium tetrachloride upon a suitable base plate maintained at a temperature of from 200 to 250° C. in a moist atmosphere, relying upon atmospheric moisture to react with the titanium tetrachloride to form titanium dioxide.

As formed, such titanium dioxide films are electrically non-conductive and are, in fact, very good insulators having very high resistances in excess of 100 megohms per square.

In accord with my invention I place base plate 5, having thereon a thin film 6 of titanium dioxide, within container 1 and cause the atmosphere within chamber 1 to be reduced to a pressure lower than 100 microns of mercury. Heater coil 8 is then energized and plate 5 is raised to a temperature of from 200 to 700° C. and maintained at that temperature for a time which may vary from 5 to 20 minutes. At temperatures lower than 200° C. and times of less than 5 minutes the conductivity of titanium dioxide layer 6 is not too greatly affected. At temperatures in excess of 700° C. and times of greater than 20 minutes, titanium dioxide layer 6 is adversely affected and begins to crack. Within these ranges of time and temperature there exists a vast number of combinations which produce varying conductivities within titanium dioxide layer 6. The conductivity desired depends upon the use to which the conductive layer is to be applied. However, there are applications for titanium dioxide films having resistivities of from several thousand megohms down to the lowest obtainable resistance. If it is desired that the resistance of titanium dioxide film 6 be reduced to the lowest possible value, the temperature of plate 5 should preferably be maintained at 550° C. to 650° C. for a time of 10 to 15 minutes. I have also found that to obtain the lowest possible resistance of film 6, the pressure within chamber 1 should preferably be maintained at a value of 1 micron of mercury or less.

In one specific example of the practice of my invention the apparatus described in the drawing was maintained at a pressure of 1 micron of mercury and a Pyrex base plate 5 having thereon a film 6 of titanium dioxide 0.4 micron thick was elevated to a temperature of 600° C. and maintained at that value for twelve minutes. After this time the plate and film were removed and the resistance of the film was found to be 60 ohms per square.

In another specific example of the practice of the invention a titanium dioxide film approximately 0.4 micron thick mounted on a Pyrex glass base plate was placed in the apparatus of the drawing while the atmosphere was maintained at 1 micron of mercury pressure. The temperature of plate 5 was raised to a value of 540° C. and maintained at that value for 15 minutes. At the end of this time the plate and film were removed and the resistance of the film was found to be 240 ohms per square.

The unit of resistance used herein is the resistance of a film of any desired thickness measured between opposite sides of a square of any dimension.

In the practice of my invention I have been able to achieve lower resistances with thin films of titanium dioxide than have been achieved by any of the methods of the prior art. Additionally, this method is reproducible, inexpensive to perform and may be operated by relatively unskilled personnel.

While I have described my invention with respect to one particular aspect thereof it is obvious that many modifications and changes may be made by those skilled in the art. I intend therefore by the appended claims to cover all such modifications and changes as fall within the true spirit and scope of the invention.

What I claim as new and desire to secure by Letters Patent of the United States is:

1. The method of rendering a film of titanium dioxide electrically conducting which comprises supporting a film of titanium dioxide out of contact with any substance other than a supporting substrate, heating the supported film of titanium dioxide from .1 to 1 micron in thickness in vacuo at a temperature of 200° C. to 700° C. for 5 to 20 minutes.

2. The method of rendering a film of titanium dioxide electrically conducting which comprises supporting a film of titanium dioxide out of contact with any substance other than a supporting substrate, heating the supported film of titanium dioxide from .1 to 1 micron in thickness in vacuo at a temperature of 550° C. to 650° C. for 5 to 20 minutes.

3. The method of rendering a film of titanium dioxide electrically conducting which comprises supporting a film of titanium dioxide out of contact with any substance other than a supporting substrate, heating the supported film of titanium dioxide from .1 to 1 micron in thickness in vacuo at a temperature of 200° C. to 700° C. for 10 to 15 minutes.

4. The method of rendering a film of titanium dioxide electrically conducting which comprises supporting a film of titanium dioxide out of contact with any substance other than a supporting substrate, heating the supported film of titanium dioxide from .1 to 1 micron in thickness at temperature of 200° C. to 700° C. for 5 to 20 minutes at a pressure of less than 100 microns of mercury.

5. The method of rendering a film of titanium dioxide electrically conducting which comprises supporting a film of titanium dioxide out of contact with any substance other than a supporting substrate, heating the supported film of titanium dioxide from .1 to 1 micron in thickness at a temperature of 550° C. to 650° C. for 10 to 15 minutes at a pressure less than 1 micron of mercury.

References Cited in the file of this patent

UNITED STATES PATENTS

| | | |
|---|---|---|
| 2,652,532 | Zemany | Sept. 15, 1953 |
| 2,715,593 | Clark | Aug. 16, 1955 |
| 2,717,844 | Koller | Sept. 13, 1955 |
| 2,732,313 | Cusano et al. | Jan. 24, 1956 |